Aug. 19, 1958  R. C. TALBOT  2,848,098
MAGNETIC CONVEYOR APPARATUS
Filed May 31, 1955  3 Sheets-Sheet 2
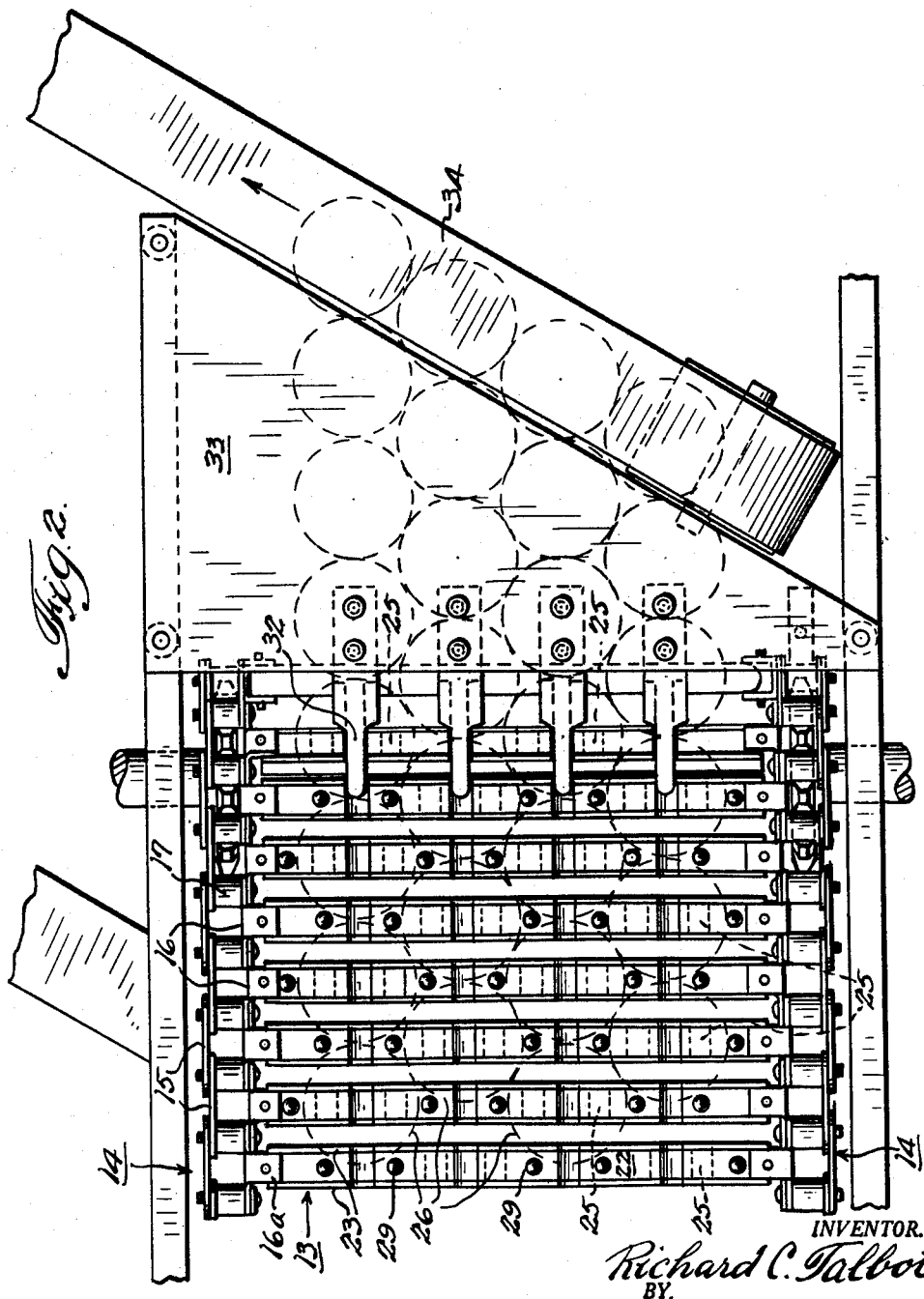
INVENTOR.
Richard C. Talbot
BY
Thiess, Olsen, Mecklenburger,
van Holst & Coltman. ATTYS.

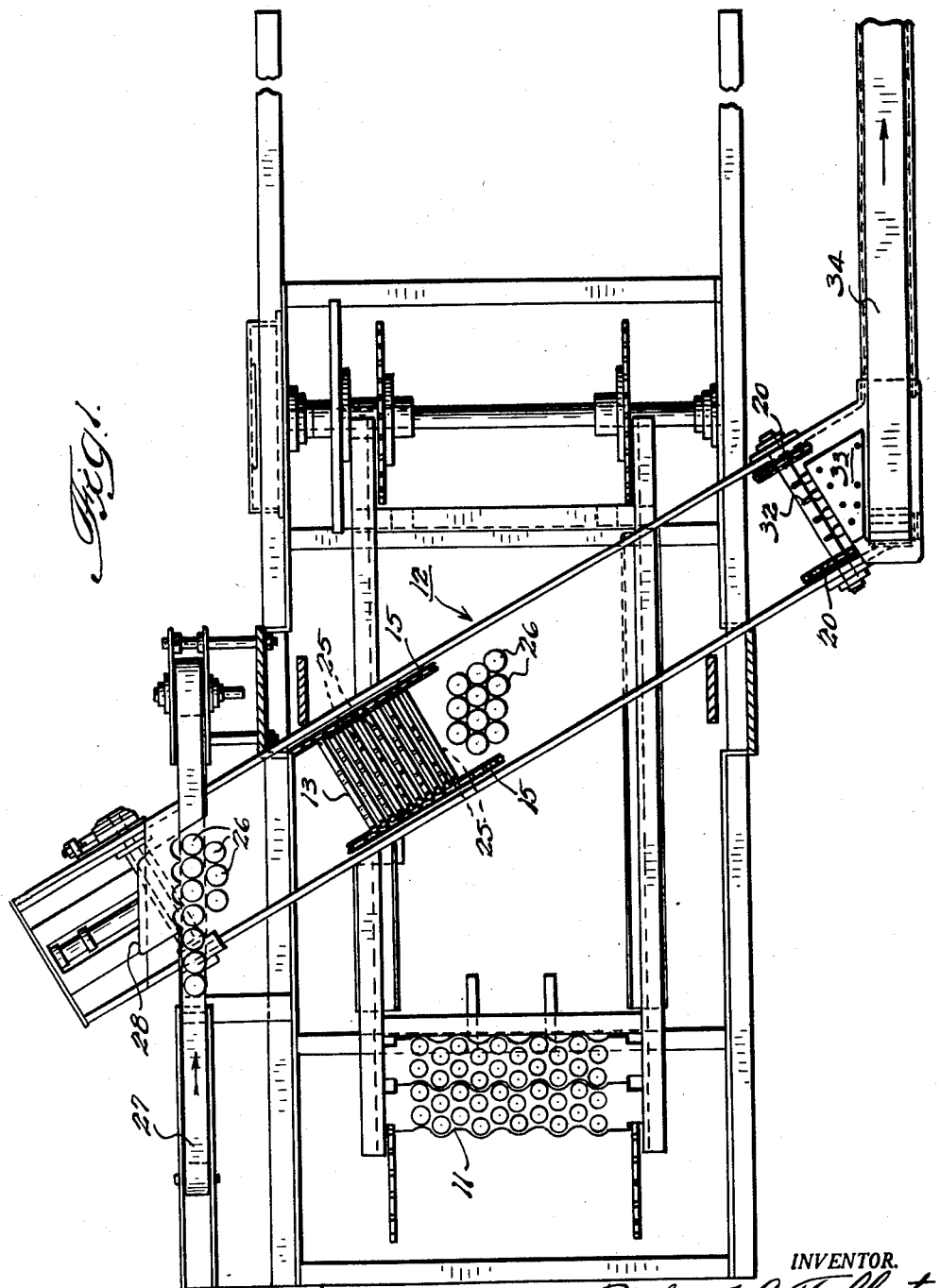

Aug. 19, 1958     R. C. TALBOT     2,848,098
MAGNETIC CONVEYOR APPARATUS
Filed May 31, 1955     3 Sheets-Sheet 3
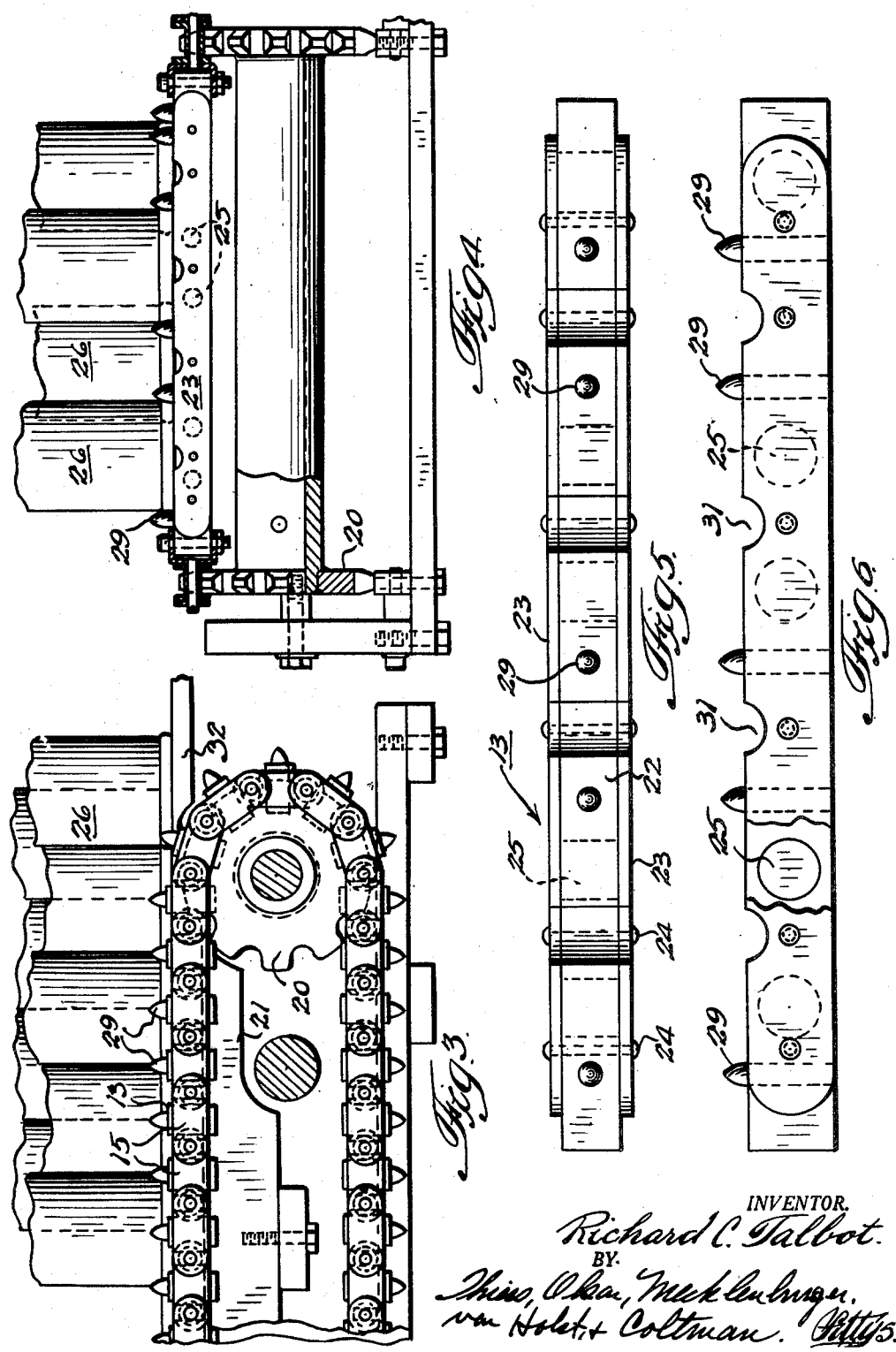
INVENTOR.
Richard C. Talbot.

United States Patent Office 2,848,098
Patented Aug. 19, 1958

2,848,098

MAGNETIC CONVEYOR APPARATUS

Richard C. Talbot, Joliet, Ill., assignor to J. L. Ferguson Company, Joliet, Ill., a corporation of Illinois Application May 31, 1955, Serial No. 512,016

9 Claims. (Cl. 198—41)

This invention relates to magnetic conveyor apparatus, and it is an object of the invention to provide improved apparatus of that character.

Endless conveyors are commonly employed for conveying articles in a specific array, one application of such apparatus being in container filling machines. In such case, empty containers may be advanced in single or multiple file to a position in which material is placed in the containers. It is sometimes necessary that the empty containers be maintained quite accurately in a given array. If the articles being conveyed (for example, empty containers) are relatively unstable, as is the case if they are tall and thin, a problem arises in maintaining the articles upright and in proper relative position.

One specific example where such a problem exists is in the conveying of empty containers to a position or positions in which ready-to-bake biscuits are placed therein. Containers for this product are conventionally cylindrical containers which are relatively tall and thin. Furthermore, the cylindrical wall of the container is conventionally relatively light-weight cardboard, the ends being of light gauge sheet metal. If the biscuit blanks are to be placed in the containers by automatic machinery, it is essential that they be maintained quite accurately in specific positions with respect to the conveyor belt and with respect to each other.

One form of complete machine for rolling, cutting and dropping biscuit dough or other material into containers, along with apparatus for conveying the empty and partially filled containers to the feeding apparatus, is disclosed and claimed in application Serial No. 263,108, entitled "Material Handling and Packaging Machine," filed December 24, 1951, by John L. Ferguson and Richard C. Talbot, and assigned to the same assignee as the present application. The present invention is an improvement over the invention disclosed and claimed in application Serial No. 263,108, but is concerned only with the conveyor apparatus, in its broad sense.

The present invention is particularly adapted to solution of the problem of handling containers such as those suggested above. However, it will be understood that the invention is not limited in its application to any particular type of container, or other article, to be conveyed.

It is another object of the invention to provide improved magnetic conveyor means capable of maintaining articles conveyed thereby in proper orientation.

It is another object of the invention to provide improved magnetic conveyor apparatus capable of maintaining relatively tall and thin, or otherwise relatively unstable, articles conveyed thereby in proper orientation.

It is another object of the invention to provide improved magnetic conveyor means capable of maintaining relatively tall and thin containers in upright spaced-apart relationship.

It is another object of the invention to provide improved magnetic conveyor means capable of maintaining relatively unstable articles in proper orientation and arranged to facilitate the original positioning of such articles on the conveyor means in proper orientation.

It is another object of the invention to provide improved conveyor apparatus including improved means for stripping conveyed articles from magnetic conveyor means.

It is another object of the invention to provide improved magnetic conveyor apparatus having one or more of the advantages recited above, while being rugged, reliable in operation, and inexpensive to manufacture.

This invention, together with further objects and advantages thereof, will best be understood by reference to the following description taken in connection with the accompanying drawings, and its scope will be pointed out in the appended claims.

In the drawings, in which like parts are designated by like reference numerals,

Figure 1 is a plan view of a portion of a machine for packaging ready-to-bake biscuit blanks, incorporating conveyor apparatus constructed in accordance with the present invention;

Fig. 2 is an enlarged plan view of a portion of the conveyor apparatus illustrated in Fig. 1;

Fig. 3 is an elevational view of a portion of the conveyor apparatus illustrated in Fig. 2;

Fig. 4 is an end view, partially broken away, of the apparatus of Fig. 3;

Fig. 5 is an enlarged plan view of a single unit of the conveyor belt of Figs. 1–4, and Fig. 6 is an elevational view of the conveyor belt unit of Fig. 5.

The invention is illustrated in the drawings as applied to a biscuit cutting and packaging machine such as that disclosed and claimed in application Serial No. 263,108, referred to above. It will be understood, of course, that the invention may be employed to advantage in other and diverse applications. In the application shown in the drawings, rolled biscuit dough is fed onto a moving endless die belt 11, and individual biscuit blanks are ultimately pushed downwardly through the die belt. It is the purpose of the container conveyor apparatus 12, in this application of the invention, to convey empty and partially filled containers to positions below the die belt 11 wherein they may receive the biscuit blanks which are thus pushed down through the die belt. Since the biscuit cutting apparatus is disclosed in detail in application Serial No. 263,108, referred to above, and since it serves only to illustrate an application of the present invention, it is not described further herein. It is sufficient, for the purpose of the present application, to indicate that the conveyor apparatus must maintain relatively unstable containers in accurate orientation in order that they may be in position to receive the biscuit blanks discharged from the die belt 11.

The conveyor 12 includes a plurality of bars 13 which extend across the width of the conveyor and comprise the main body thereof. The bars 13 are supported on a pair of roller link chains 14, one at either side of the conveyor. These chains may be of conventional construction comprising outer links 15, inner links 16 and rollers 17. The inner links 16 will be seen to extend inwardly of the conveyor belt to provide flanges 16a to which the ends of the bars 13 are attached. The chains 14 ride over and are driven by suitable sprocket wheels 20 (see Fig. 3) arranged at opposite ends of the travel of the conveyor belt. The upper portion of the conveyor belt is supported by engagement of the rollers 17 with suitably spaced tracks 21.

In the illustrated embodiment of the invention, each of the bars 13 includes a main central portion 22 which is preferably of nonmagnetic material such as brass or bronze. Plates 23 are secured to opposite sides of the core 22 by any suitable means such as the rivets 24. The rivets 24 are preferably nonmagnetic whereas the plates 23 are formed of steel or other magnetizable material.

The core 22 is drilled through, longitudinally of the ultimate conveyor belt, and magnets 25 are placed in the drilled holes. The magnets are, of course, placed in position prior to the securing of the plates 23 to the sides of the core 22, and the magnets 25 in any given bar 13 are so oriented that like poles of each magnet face the same steel plate 23. Accordingly, one plate 23 is made a magnetic north pole, while the other plate is made a magnetic south pole, there being no return path for the magnetic flux through magnetizable material.

In order for the conveyor belt 12, as constructed of the magnetic bars 13, to be effective in maintaining conveyed articles in fixed position thereon, the articles must be of magnetizable material, at least adjacent the belt-contacting portions. If, for example, the articles to be conveyed are containers for ready-to-bake biscuit blanks, the sheet metal closure at the end of the cardboard tube which generally comprises such containers will be attracted forcibly to the upper surface of the conveyor belt whereby the container is held rigidly upright and is maintained against lateral movement with respect to the belt.

In Fig. 2 the containers 26 are shown in phantom lines. Each container is shown to be centered on a single bar 13. Since one of the plates 23 thereof is a north magnetic pole while the other is a south magnetic pole, the sheet metal bottom of the container forms a low reluctance flux return path between the two magnetic poles and accordingly is strongly attracted to that bar 13. Additionally, the magnetizable bottom of each container also overlies one plate 23 of each of the adjoining bars 13 and is thereby attracted to the adjoining bars.

In the particular embodiment illustrated, two magnets 25 within each bar 13 are located below the position intended for each container whereby the magnetic field is strongest directly below the bottom of the container. It will be understood, however, that there will be a strong magnetic field between the two face plates 23 of any given bar 13 at all points along the length of the bar.

The invention as thus far described provides an endless flexible belt which magnetically attracts any magnetizable article placed thereon whereby it tends to maintain any such article in a given orientation on the belt. The preferred construction disclosed produces a strong magnetic field for attraction of magnetizable articles with a small number of magnets.

In the particular application of the invention being described herein, the movement of the conveyor belt 13 is intermittent, the belt, and hence the containers carried thereby, being stationary during that portion of the operating cycle of the biscuit cutting machine when biscuit blanks are being thrust downwardly through the die belt and into the containers. During the time that the conveyor belt is stationary, a row of containers may be advanced by another conveyor belt 27 (see Fig. 1) to a position overlying the conveyor apparatus 12. When the conveyor apparatus 12 again advances, the row of containers thus arranged above the conveyor apparatus 12 may be advanced along with the conveyor apparatus 12 by any suitable means, such as a plunger 28. It will be readily understood that the plunger 28 may be driven by the same apparatus as that which drives the conveyor apparatus 12 and may be so timed that it advances the new row of containers along with the conveyor apparatus 12 in such a way that the new row of containers slides off the conveyor belt 27 and onto the conveyor apparatus 12 in approximately the desired position.

In order to assure accurate positioning of each new row of containers as they are dropped onto the conveyor apparatus 12 and, further, to prevent any lateral movement of the containers with respect to the conveyor belt 12 after being deposited thereon, a plurality of spacer elements 29 are arranged on each bar 13. These spacer elements are set into suitable openings in the central portion 22 of each bar 13. In Fig. 6 it will be seen that they taper to a point. In Fig. 2 the over-all arrangement of the spacer elements 29 may be seen to be such that six spacer elements (two each in three successive bars) are arranged to define the position for each container. The elements are of such diameter that adjoining containers are spaced minutely apart and cannot interfere with each other.

As additional rows of containers are thrust laterally off the conveyor belt 27 onto the conveyor belt 12 (see Fig. 1), the timing of the various movements is such that the containers are deposited in substantially the correct position on the conveyor belt 12. Because of the tapered or cone-like configuration of the exposed portions of the spacer elements 29, the containers are guided by the spacer elements into their exact desired positions.

The spacer elements are preferably nonmagnetic since any attraction between the spacer elements and the lower portions of the containers would tend to prevent the settling of the containers down to the principal surface of the conveyor belt between the spacer elements.

As may be seen best in Fig. 6, each bar 13 has transverse slots 31 arranged therein, and in Fig. 2 it may be seen that the slots in the various bars 13 are aligned in the assembled conveyor belt. At the exit end of the conveyor belt 12 a series of fingers 32 are provided. These fingers extend into the grooves 31 and the upper surfaces thereof lie minutely below the upper surface of the bars 13. Accordingly, as the containers 26, or other articles carried by the conveyor, approach the exit end of the conveyor belt, they pass above the fingers 32.

As the successive bars 13, with which any given container is in contact, pass over the sprocket 20 and are carried down below the upper plane of the conveyor belt, the containers are restrained from following the bars 13 by engagement with the fingers 32. At the same time they are thrust forward over the fingers and onto a platform 33 by the trailing spacer elements 29. The containers are thrust further forward along the platform 33 by the following containers and ultimately may be thrust onto another conveyor belt 34 for ultimate disposition.

It will now be seen that a magnetic conveyor belt constructed in accordance with the present invention is well adapted to conveying articles in fixed predetermined orientation with respect to each other and with respect to the conveyor belt, it being essential of course that at least the lower portion of the containers or other articles is magnetizable. The invention is particularly adapted for use with relatively unstable containers or other articles, it being understood that the term "unstable" as employed herein defines a condition of instability as to any one or more of the elements entering into orientation of the article. More specifically, the invention is particularly adapted to use with articles which have a tendency to fall, slide or twist out of their desired orientation.

In the particular embodiment of the invention illustrated in the drawings and described above, individual magnets are arranged within individual elements of the belt. It will be understood, however, that the source of magnetic attraction may be incorporated in the belt in any desired manner. Each individual bar, plate or section of the belt might, for example, constitute a single magnet. The illustrated embodiment is preferred because of the relative economy.

While particular embodiments of the invention have been shown, it will be understood, of course, that the invention is not limited thereto since many modifications may be made, and it is, therefore, contemplated to cover by the appended claims any such modifications as fall within the true spirit and scope of the invention.

It will be apparent that the invention may be varied in its physical embodiment without departing from the spirit of the invention, and it is desired, therefore, that the invention be limited only by the prior art and the scope of the appended claims.

The invention having thus been described, what is claimed and desired to be secured by Letters Patent is:

1. In a conveyor belt for conveying relatively unstable containers in spaced-apart relationship, said containers being magnetically attractable at least adjacent their bottom portions; a flexible belt, magnet means incorporated in said belt, and non-magnetic spacer elements protruding from said belt, said spacer elements being arranged to define areas on said belt to be occupied by said containers.

2. In a conveyor belt for conveying relatively unstable containers in spaced-apart relationship, said containers being magnetically attractable at least adjacent their bottom portions; a flexible belt, magnet means incorporated in said belt, and non-magnetic spacer elements protruding from said belt, said spacer elements being arranged to define areas on said belt to be occupied by said containers and having sloping sides facing said defined areas.

3. In a conveyor belt for conveying relatively unstable containers in spaced-apart relationship, said containers being magnetically attractable at least adjacent their bottom portions; a substantially horizontal flexible belt, magnet means incorporated in said belt, and non-magnetic spacer elements protruding upwardly from said belt, said spacer elements being arranged to define areas on said belt to be occupied by said containers and being generally cone shaped with their points rising above said belt.

4. In a conveyor belt for conveying relatively tall thin cylindrical containers in spaced-apart relationship, said containers being magnetically attractable at least adjacent their bottom portions; a substantially horizontal flexible belt, magnet means incorporated in said belt, and non-magnetic spacer elements protruding upwardly from said belt, said spacer elements being generally cone shaped with their points rising above said belt and being arranged to define hexagonal areas of such size that the bottoms of said containers may be received therebetween.

5. In a conveyor belt for conveying relatively unstable containers in spaced-apart relationship, said containers being magnetically attractable at least adjacent their bottom portions; a flexible belt for supporting and for conveying said containers longitudinally of itself, magnet means incorporated in said belt, and non-magnetic spacer means protruding from said belt, said spacer means being arranged to define areas on said belt to be occupied by said containers, said magnet means comprising elongated magnetically attractable members extending laterally of said belt and permanent magnets arranged with like poles abutting common ones of said members.

6. In a conveyor belt for conveying relatively unstable containers in spaced-apart relationship, said containers being magnetically attractable at least adjacent their bottom portions; a flexible belt for supporting and for conveying said containers longitudinally of itself, said belt comprising a plurality of interconnected spaced-apart laterally extending bars, each of said bars including a non-magnetic portion and a pair of magnetically attractable portions, all extending substantially the full effective length of said bars, and a plurality of permanent magnets arranged within said non-magnetic bar portions and having their poles abutting the corresponding magnetically attractable portions.

7. In a conveyor belt for conveying relatively unstable containers in spaced-apart relationship, said containers being magnetically attractable at least adjacent their bottom portions; a flexible belt for supporting and for conveying said containers longitudinally of itself, said belt comprising a plurality of interconnected spaced-apart laterally extending bars, each of said bars including a non-magnetic portion and a pair of magnetically attractable portions, all extending substantially the full effective length of said bars, and a plurality of permanent magnets arranged within said non-magnetic bar portions and having their poles abutting the corresponding magnetically attractable portions; and a plurality of non-magnetic spacer elements protruding from said bars and arranged to define areas on said belt to be occupied by said containers.

8. In conveyor means for conveying relatively unstable containers in spaced-apart relationship, said containers being magnetically attractable at least adjacent their bottom portions; a movable endless belt having a substantially horizontal portion for supporting and advancing said containers, magnet means incorporated in said belt, and non-magnetic spacer elements protruding from said belt, said spacer elements being arranged to define areas on said belt to be occupied by said containers, and a plurality of fingers arranged in generally the same plane as said horizontal portion of said belt and extending into the container discharge end thereof, said belt having grooves therein, intermediate said spacer elements, for receiving said fingers.

9. In combination, a flexible conveyor belt, a plurality of permanent magnets integrally incorporated in said belt, means carried by said belt for spacing and positioning articles being conveyed on said belt with respect to certain areas of said belt.

References Cited in the file of this patent
UNITED STATES PATENTS

| 1,168,281 | Buch | Jan. 18, 1916 |
| 2,708,022 | Pettigrew | May 10, 1955 |
| 2,782,516 | Stoeckel et al. | Feb. 26, 1957 |

FOREIGN PATENTS

| 1,023,148 | France | Mar. 13, 1953 |